United States Patent
Roeingh et al.

[11] Patent Number: 5,860,746
[45] Date of Patent: Jan. 19, 1999

[54] SEALELD ROLL BEARING

[75] Inventors: Konrad Roeingh, Hilchenbach; Matthias Tuschhoff, Siegen; Karl-Friedrich Müller, Erndtebrück, all of Germany

[73] Assignee: SMS Schloemann-Siemag Aktiengesellschaft, Düsseldorf, Germany

[21] Appl. No.: 895,008

[22] Filed: Jul. 16, 1997

[30] Foreign Application Priority Data

Jul. 17, 1996 [DE] Germany ............ 196 28 731.6

[51] Int. Cl.⁶ .................. F16C 33/74; F16J 15/32
[52] U.S. Cl. .................. 384/152; 384/130; 384/144; 277/350; 277/642; 277/910
[58] Field of Search .................. 384/130, 132, 384/139, 140, 143, 144, 147, 151, 152, 416, 418, 477, 480, 489, 546; 277/350, 411, 641, 642, 910

[56] References Cited

U.S. PATENT DOCUMENTS

| | | | |
|---|---|---|---|
| 3,093,425 | 6/1963 | Rich, Jr. ........................ | 384/145 |
| 4,063,743 | 12/1977 | Petros .......................... | 277/563 |
| 4,435,096 | 3/1984 | Petros .......................... | 384/147 |
| 4,455,856 | 6/1984 | Salter, Jr. et al. .............. | 277/349 X |
| 4,630,458 | 12/1986 | Kakabaker ..................... | 384/480 |
| 4,790,673 | 12/1988 | Simmons ....................... | 384/147 |
| 4,866,827 | 9/1989 | Benfer et al. .................. | 277/351 |

Primary Examiner—Thomas R. Hannon
Attorney, Agent, or Firm—Friedrich Kueffner

[57] ABSTRACT

A sealed roll bearing of a roll which has neck sleeves of high strength, preferably shrunk onto the roll necks of the roll, wherein the flanges of a profiled sealing ring sealingly engage over the end portions of the neck sleeve facing the end faces of the roll bodies and at least over portions of the end phases of the roll bodies. The flanges of the profiled sealing rings engaging over the end faces of the roll bodies are connected to the end faces of the roll bodies and the flanges of the profiled sealing rings engaging over the end portions of the neck sleeves surround the flanges of the profiled sealing rings engaging over the end portions of the neck sleeves so as to form a narrow gap, wherein the narrow gap is sealed by means of at least one sealing device.

16 Claims, 4 Drawing Sheets

SEALED ROLL BEARING

BACKGROUND OF THE INVENTION

1. Field of the Invention

The present invention relates to a sealed roll bearing of a roll which has neck sleeves of high strength, preferably shrunk onto the roll necks of the roll, wherein the flanges of a profiled sealing ring sealingly engage over the end portions of the neck sleeve facing the end faces of the roll bodies and at least over portions of the end phases of the roll bodies.

2. Description of the Related Art

The stress areas of a roll which are located between the roll necks supported by the bearings and the end faces of the roll bodies are kept free of aggressive rolling media and also essentially free of oil emerging from the bearings by means of sealing assemblies proposed in the past which sealingly engage over the neck sleeves of the bearings as well as over the end faces of the roll bodies.

For example, U.S. Pat. No. 4,790,673 discloses sealing rings which are shrunk onto projections of the neck sleeves, wherein the sealing rings are pretensioned, if necessary, by means of sealing elements, against the end faces of the roll bodies. These sealing rings have the disadvantage that, in the case of relative bending movements between the roll necks and the roll body caused by the rolling force, the sealing rings do not participate in these bending movements at least in the area of the contact surfaces with the end face of the roll body, so that gaps may be formed through which aggressive rolling media may reach into the stress area of the roll.

When the sealing rings are shrunk onto the projections of the neck sleeves, the sealing rings change their dimensions not only in radial direction, but they also shrink in axial direction. Consequently, microscopically small gaps may be formed between the end faces of the roll bodies and the sealing ring flanges resting against the end faces of the roll bodies already during the assembly of the sealing rings, wherein the aggressive rolling medium can easily reach the stress area of the roll necks through these gaps.

By shrinking the sealing rings onto portions of the neck sleeves, these neck sleeve portions are pressed against the roll necks or the tension areas of the roll. As a result of the relative bending movement described above and this pressing action, high stresses may occur in the tension area of the roll between the roll and the pretensioned neck sleeves, so that pitting formations cannot be excluded.

In order to eliminate this disadvantage, it has already been proposed to screw the sealing ring flanges located opposite the end faces of the roll bodies to the end faces. However, it has been found that the sealing rings, which are shrunk-on one side and screwed-on on the other side, do not participate the above-described bending movements in the stress area of the roll neck. Because of the tensions occurring as a result in the sealing rings, the screws have been elongated and the screw heads were partially torn off or sheared off.

SUMMARY OF THE INVENTION

Therefore, it is the primary object of the present invention to further develop a sealing assembly of a roll bearing in such a way that the sealing rings of the roll tension areas are capable of sealing in an optimum manner even during the rolling operation and the bending movements occurring during the rolling operation, wherein the sealing assembly additionally has a long service life.

In accordance with the present invention, the flanges of the profiled sealing rings engaging over the end faces of the roll bodies are connected to the end faces of the roll bodies and the flanges of the profiled sealing rings engaging over the end portions of the neck sleeves surround the flanges of the profiled sealing rings engaging over the end portions of the neck sleeves so as to form a narrow gap, wherein the narrow gap is sealed by means of at least one sealing device.

In accordance with a feature of the present invention, the rigid connections between the end faces of the roll bodies and the flanges of the profiled sealing rings resting against the end faces of the roll bodies are screw connections. The rigid screw connections ensure that no aggressive rolling medium can reach the stress area of the roll. Thus, the screw connection ensures a tight seat of the flanges of the profiled sealing rings around the roll against the end faces of the roll bodies.

In accordance with another feature, cylindrically shaped stiffening tongues extending essentially concentrically to the flanges extending over the end portions of the neck sleeves are provided at the ends of the flanges connected to the roll bodies. The cylindrically shaped stiffening tongues additionally ensure that the intermediate regions between the individual screw connections rest tightly against the end faces of the roll bodies without creating shifting in this area of the flanges, so that it is ensured with certainty that no aggressive rolling medium can reach the stress area of the roll. The cylindrically shaped stiffening tongues produce the advantage that the flanges rest plane against the end faces of the roll bodies and are stiffened in such a way that, even in the case of a rigid screw connection, the plane-parallel configuration relative to the end faces of the roll bodies is not lost. Additional sealing elements between the profiled sealing rings and the end faces of the roll bodies increase the sealing effect in screw connections.

Instead of using the screw connections, the flange of the profiled sealing ring can also be shrunk onto the end face of the roll body.

The profiled sealing rings are supported by the screw connections or the shrunk-on connections. The second flanges of the profiled sealing rings, i.e., the flanges engaging over the end portions of the neck sleeves, are not rigidly attached to the neck sleeve, so that tensions in the profiled sealing rings cannot occur. The sealing devices between the second flanges of the profiled sealing rings and the neck sleeves ensure that no oil can reach from the bearing area into the stress area of the roll and, in addition, they ensure that expansions or displacements resulting between the profiled sealing rings and the neck sleeves can be compensated.

Gaps which are as narrow as possible are formed between the second flanges of the profiled sealing rings and the neck sleeves engaging over the second flanges, wherein these narrow gaps have the effect of a throttle which reduces the oil pressure toward the sealing device. The additional sealing devices may be formed as grooves or as steps of the gap acting as smoothing spaces or as labyrinths and serve to further reduce the oil pressure.

In accordance with a feature of the present invention, the sealing devices may include two grooves circumferentially extending in the neck sleeve or the second flange of the profiled sealing ring and O-rings placed in the grooves. Consequently, oil which may have passed the O-rings located closer to the bearings can be discharged through a relief bore, so that the sealing devices constructed as O-rings are not subjected to greater dynamic pressures.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
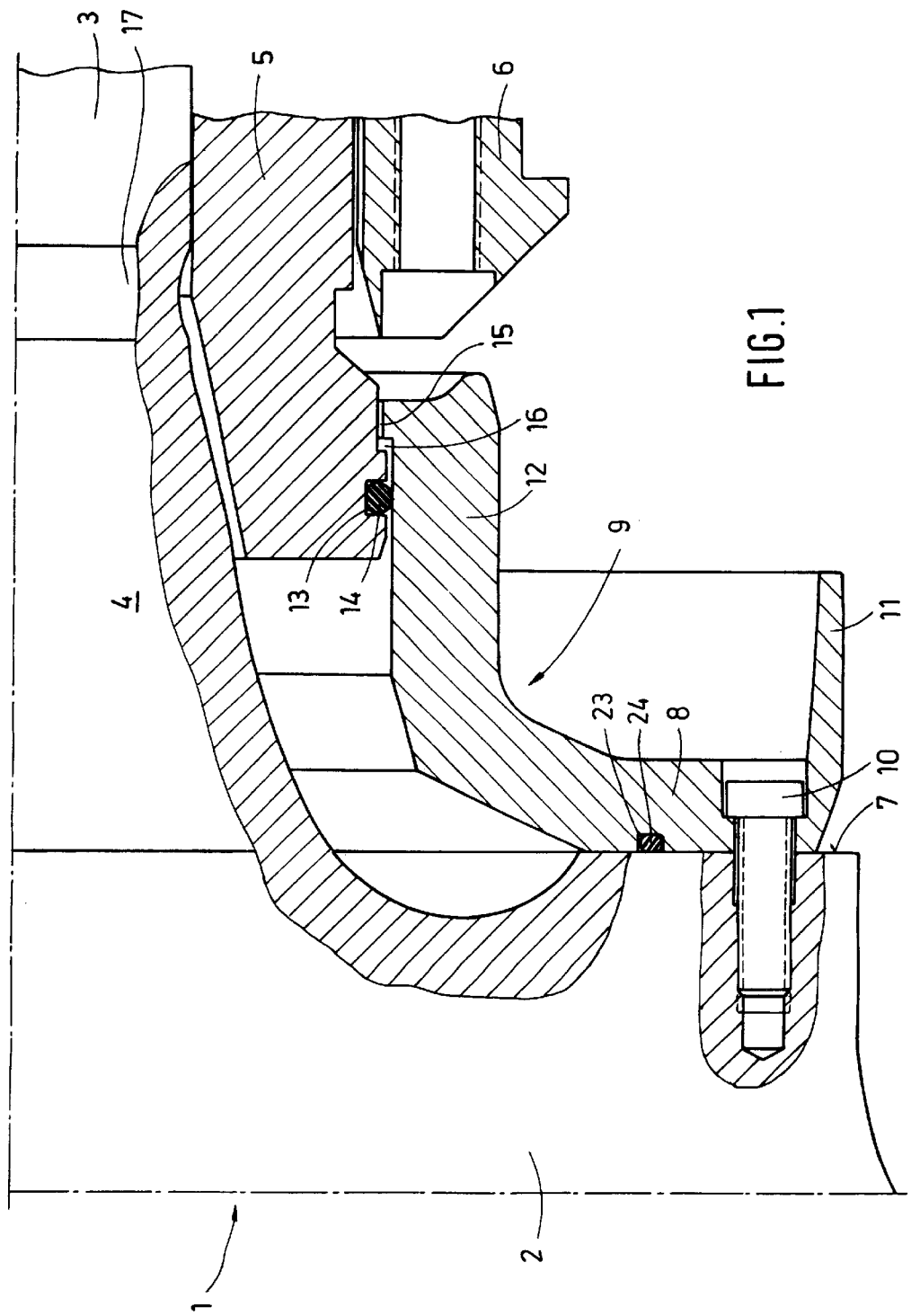
FIG. 1 is a side view, partially in section, showing a roll area with a profiled sealing ring according to the present invention and a labyrinth as a second sealing device.

FIG. 1 of the drawing shows a portion of a roll 1. Shown are the roll body 2, the roll neck 3 and the so-called stress area 4 of the roll 1. The neck sleeve 5 is arranged on the roll neck 3, wherein the neck sleeve 5 forms the bearing together with the bearing sleeve 6. A flange 8 of a profiled sealing ring 9 is attached by means of screws 10 to the end face 7 of the roll body 2. A cylindrically shaped stiffening tongue 11 is provided at the free end of the flange 8. The stiffening tongue 11 serves to counteract distortions of the flange 8.

The flange 12 of the profiled sealing ring 9 engages over the neck sleeve 5. An annular groove 13 which receives an O-ring 14 is provided in the neck sleeve 5. The O-ring 14 elastically seals the profiled sealing ring 9 relative to the neck sleeve 5. To ensure that oil emerging from the bearings 5, 6 does not act with full pressure on the O-ring 14, a gap 15 which is as narrow as possible is provided between the flange 12 and the neck sleeve 5, wherein the gap 15 has the effect of a throttle. The gap 15 expands toward a smoothing space which has the form of a labyrinth 16. Together with the gap 15, the labyrinth 16 ensures that the oil pressure acting on the O-ring 14 is reduced to a minimum.

A circumferential groove 17 is provided between the stress area 4 and the roll neck 3 of the roll 1. The groove 17 has the purpose of preventing the neck sleeve 5 from contacting the stress area 4 when relative bending movements of the stress area 4 occur relative to the neck sleeve 5, so that it is prevented that this load promotes the pitting formation.

Figure 2:
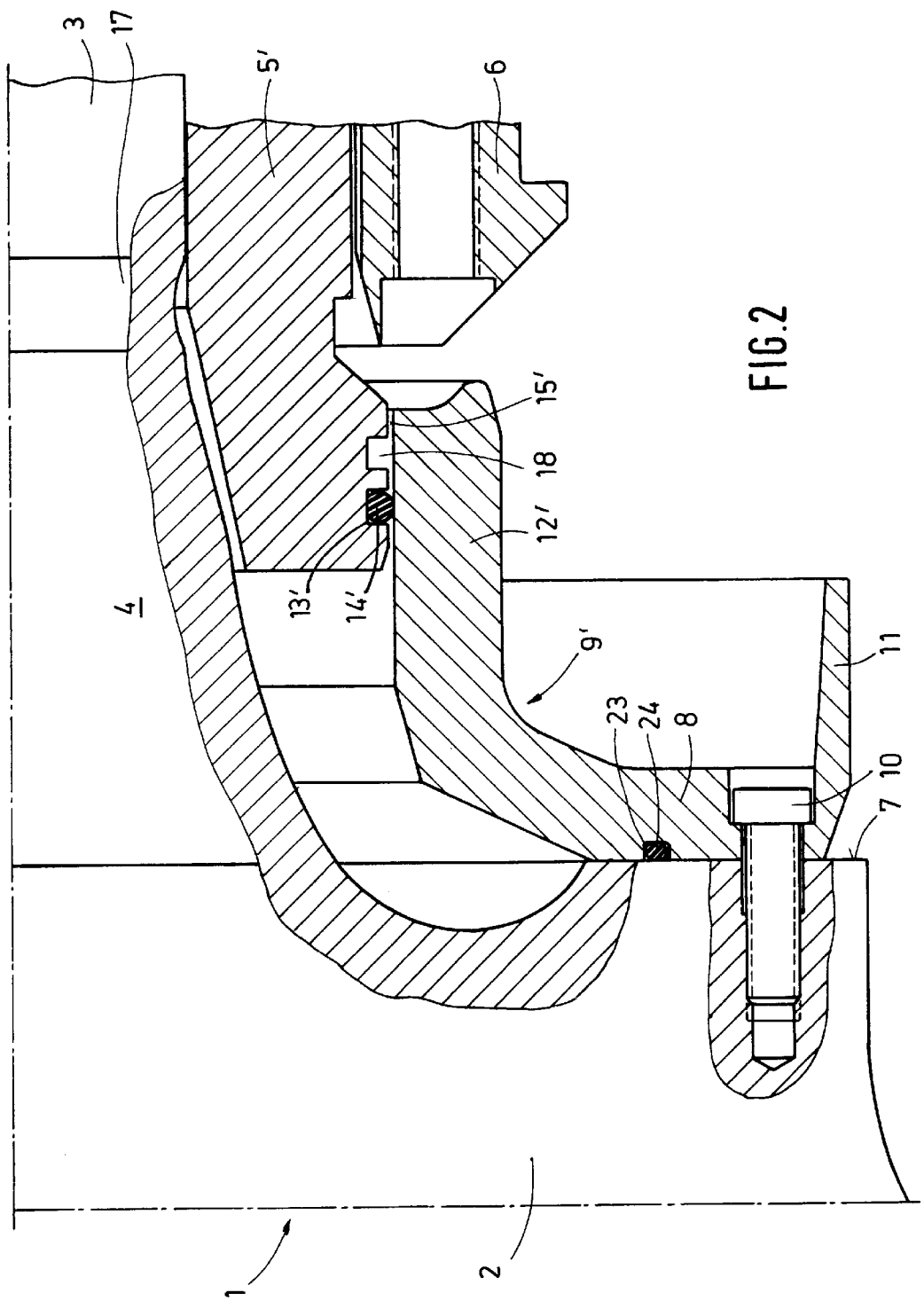
FIG. 2 is a side view, partially in section, showing a roll area with a profiled sealing ring according to the present invention with an annular relief groove.

FIG. 2 of the drawing is a view similar to FIG. 1, however, the neck sleeve 5' of FIG. 2 has a second annular groove 18 in addition to the annular groove 13'. Also in this case, the gap 15' between the neck sleeve 5' and the flange 12' serves as a throttle, while the annular groove 18 serves as a smoothing space, so that only leakage oil having a low pressure can act also in this case on the O-ring 14'.

Figure 3:
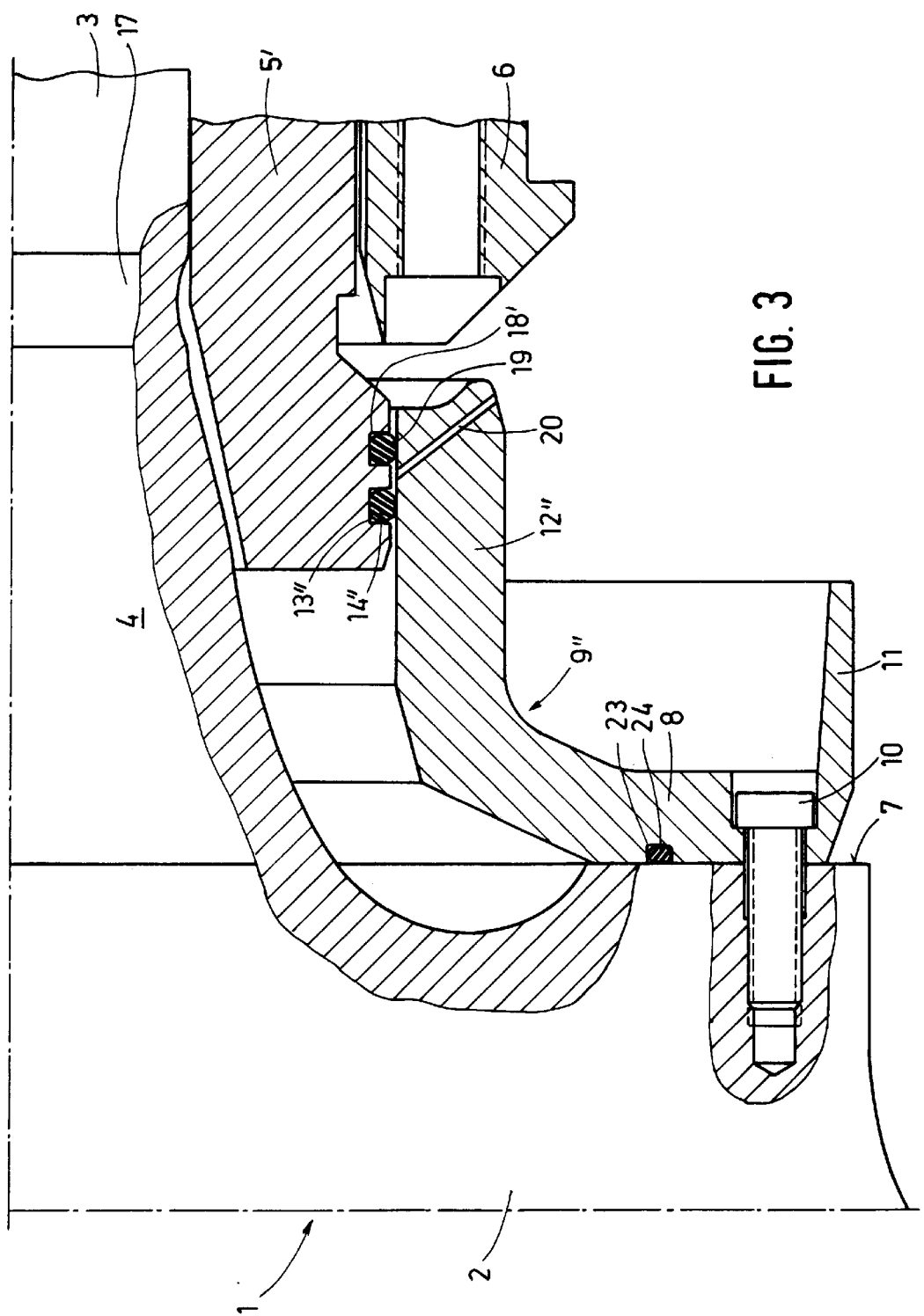
FIG. 3 is a side view, partially in section, showing a roll area with a profiled sealing ring according to the present invention as well as two O-rings and a relief bore.

Similar to FIG. 2, FIG. 3 shows two annular grooves 13", 18' with O-rings 14", 19, respectively, being placed in the grooves. If oil reaches between the O-ring 19 and the flange 12" to the O-ring 14", this leakage oil can be discharged through a relief bore 20. As a result, if at all, only oil having a low pressure acts on the O-ring 14".

Figure 4:
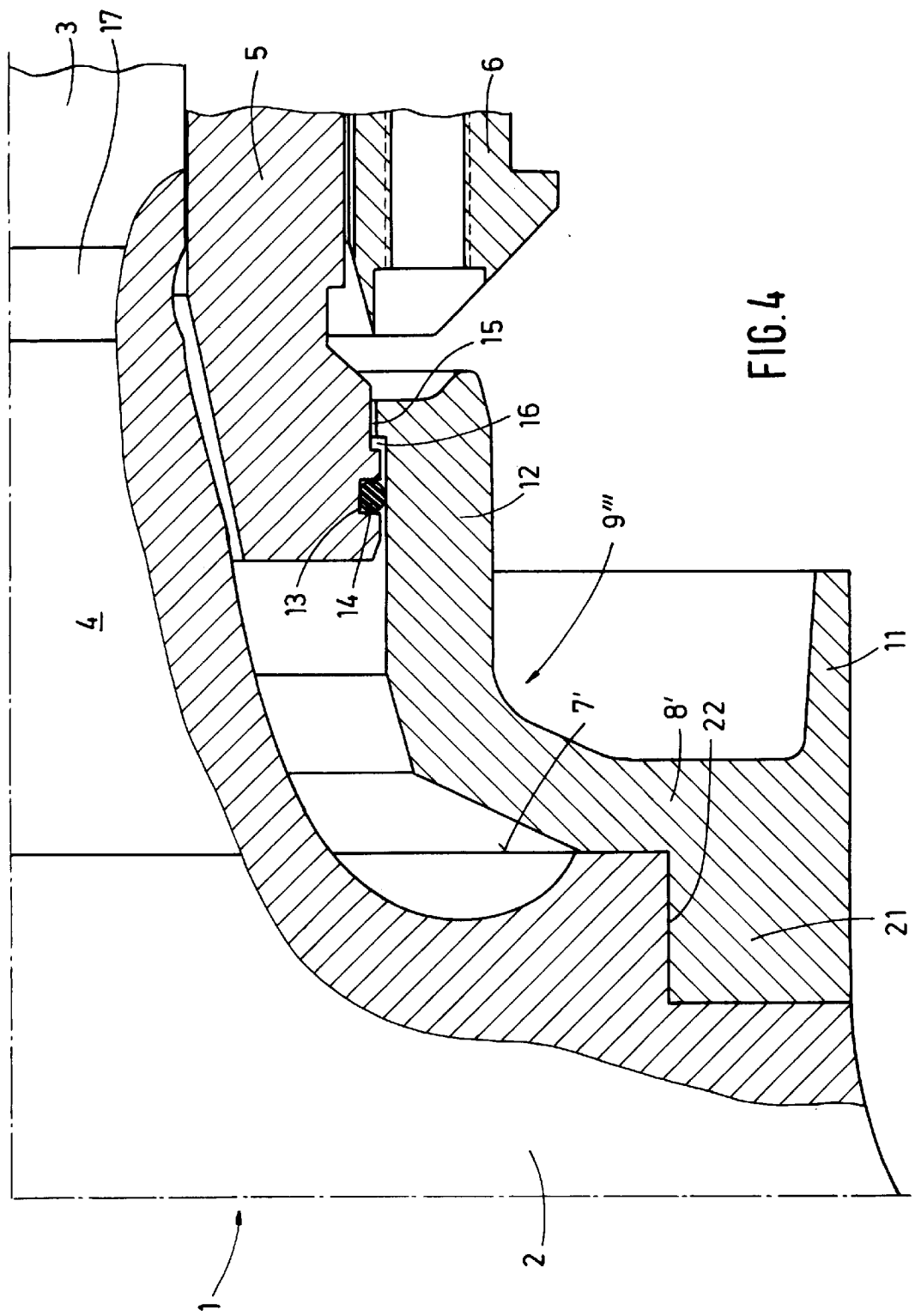
FIG. 4 is a side view, partially in section, showing a profiled sealing ring shrunk onto the end phase of a roll body.

FIG. 4 of the drawing shows that the end face 7' of the roll body has a step forming an end face portion 22 which extends essentially parallel to the roll axis. The profiled sealing ring 9''' has a projection 21 which is shrunk onto the end face portion 22. As a result, the screw connections shown in FIGS. 1 through 3 are not required, while a connection which is tight with respect to rolling emulsion as well as bearing oil is still achieved between the end face of the roll body and the profiled sealing ring.

Of course, the profiled sealing ring 9''' shown in FIG. 4 may have in the area of its second flange 12, 12', 12" sealing devices as they are shown in FIGS. 1 through 3.

The sealed bearing according to FIGS. 1 through 3 can have in addition to the screw connections a circumferential groove 23 in which sealing elements 24 may be arranged in order to achieve an even greater sealing effect.

FIGS. 1 through 4 of the drawing show oil film bearings which are provided with the sealing devices according to the present invention. However, the use of the sealing devices according to the invention is not limited to oil film bearings. Other types of bearings, such as roller bearings, can also be provided with the sealing devices.

The invention is not limited by the embodiments described above which are presented as examples only but can be modified in various ways within the scope of protection defined by the appended patent claims.

We claim:

1. A sealed roll bearing for a roll having roll necks, a bearing sleeve having a high strength being mounted on each roll neck, the bearing comprising a profiled sealing ring having flanges which sealingly engage over an end portion of the neck sleeve facing an end face of a roll body of the roll and over at least portions of the end face of the roll body, wherein a first of the flanges of the profiled sealing ring engaging over the end face of the roll body is rigidly connected to the end face of the roll body, and wherein a second of the flanges of the profiled sealing ring engaging over the end portion of the neck sleeve surrounds the end portion of the neck sleeve so as to form a narrow gap, further comprising at least one sealing device for sealing the narrow gap.

2. The sealed roll bearing according to claim 1, wherein the neck sleeve is shrunk onto the roll neck.

3. The sealed roll bearing according to claim 1, wherein the at least one sealing device is an O-ring.

4. The sealed roll bearing according to claim 1, comprising screw connections for rigidly connecting the first flange of the profile sealing ring to the end face of the roll body.

5. The sealed roll bearing according to claim 1, wherein the first flange of the profiled sealing ring and the end face of the roll body are rigidly connected by shrunk-on connections.

6. The sealed roll bearing according to claim 5, wherein the roll has an axis, and wherein the first flange of the profiled sealing ring has a projection and the end face of the roll body has an end face portion extending essentially parallel to the axis of the roll, the projection being shrunk onto the end face portion.

7. The sealed roll bearing according to claim 1, wherein the sealing devices between the neck sleeve and the second flange of the profiled sealing ring are comprised of grooves provided in at least one the neck sleeve and the second flange.

8. The sealed roll bearing according to claim 7, wherein the sealing devices comprise O-rings arranged in the grooves.

9. The sealed roll bearing according to claim 8, comprising at least one additional sealing device arranged in front of the sealing devices.

10. The sealed roll bearing according to claim 9, wherein the at least one additional sealing device is comprised of a circumferential groove in at least one of the neck sleeve and the second flange.

11. The sealed roll bearing according to claim 9, wherein the at least one additional sealing device is comprised of a step in the narrow gap forming a labyrinth.

12. The sealed roll bearing according to claim 8, wherein two sealing devices formed by circumferential grooves and O-rings placed in the circumferential grooves are arranged one behind the other in axial direction.

13. The sealed roll bearing according to claim 12, wherein the second flange of the profiled ring has relief bores for relieving an area between the two sealing devices.

14. The sealed roll bearing according to claim 1, further comprising a cylindrically shaped stiffening tongue provided at an end of the first flange connected to the roll body, wherein the cylindrically shaped stiffening tongue extends essentially concentrically relative to the second flange of the sealing ring.

15. The sealed roll bearing according to claim 1, comprising grooves formed in at least one of the end faces of the roll body and the first flange of the profiled sealing ring.

16. The sealed roll bearing according to claim 15, comprising sealing elements arranged in the grooves.

* * * * *